United States Patent
Liao (10) Patent No.: US 11,950,023 B2
(45) Date of Patent: Apr. 2, 2024

(54) INTELLIGENT AUTOMOBILE NETWORKING SYSTEM

(71) Applicant: SanJet Technology Corp., Hsinchu (TW)

(72) Inventor: Yun-Song Liao, Hsinchu (TW)

(73) Assignee: SanJet Technology Corp., Hsinchu (TW)

( * ) Notice: Subject to any disclaimer, the term of this patent is extended or adjusted under 35 U.S.C. 154(b) by 104 days.

(21) Appl. No.: 17/842,774

(22) Filed: Jun. 16, 2022

(65) Prior Publication Data

US 2023/0336693 A1    Oct. 19, 2023

(30) Foreign Application Priority Data

Apr. 18, 2022   (TW) ................... 111114707

(51) Int. Cl.
| | |
|---|---|
| *H04N 7/18* | (2006.01) |
| *G08B 21/18* | (2006.01) |
| *H04L 65/401* | (2022.01) |
| *H04N 23/661* | (2023.01) |
| *G06Q 10/1093* | (2023.01) |

(52) U.S. Cl.
CPC ............ *H04N 7/181* (2013.01); *G08B 21/18* (2013.01); *H04L 65/401* (2022.05); *H04N 23/661* (2023.01); *G06Q 10/1093* (2013.01)

(58) Field of Classification Search
CPC ...... H04N 7/181; H04N 23/661; G08B 21/18; H04L 65/40; G06Q 10/1093
USPC ..................................... 348/148, 113; 701/36
See application file for complete search history.

(56) References Cited

U.S. PATENT DOCUMENTS

| | | | | |
|---|---|---|---|---|
| 9,686,386 | B1* | 6/2017 | Kubasik ............ | H04M 1/72457 |
| 9,858,538 | B1* | 1/2018 | Johansson .......... | G01C 21/3484 |
| 10,440,169 | B1* | 10/2019 | Gordon .............. | G06F 3/04886 |
| 11,336,955 | B1* | 5/2022 | White .................... | H04W 4/02 |
| 2004/0225425 | A1* | 11/2004 | Kindo .................. | G08G 1/0969 |
| | | | | 348/148 |
| 2014/0306833 | A1* | 10/2014 | Ricci ..................... | G06F 16/583 |
| | | | | 340/901 |
| 2014/0309789 | A1* | 10/2014 | Ricci ....................... | G06F 16/25 |
| | | | | 700/276 |
| 2014/0310739 | A1* | 10/2014 | Ricci .................... | G06Q 20/321 |
| | | | | 725/75 |
| 2015/0049184 | A1* | 2/2015 | Hooton .................... | H04N 7/18 |
| | | | | 348/113 |
| 2016/0057342 | A1* | 2/2016 | Plante ................... | H04N 23/80 |
| | | | | 348/148 |

(Continued)

*Primary Examiner* — Thai Q Tran
*Assistant Examiner* — Stephen R Smith
(74) *Attorney, Agent, or Firm* — Chih Feng Yeh; Yongjean Consulting Inc.

(57) ABSTRACT

An intelligent automobile networking system, which includes a cloud server, a dash camera installed on a vehicle communicatively coupled to the cloud server for recording the video and position information related to the driving of the vehicle, an IP camera installed on a place exclude the dash camera and the cloud server to record surveillance images of that place, and a mobile device is communicatively coupled to the cloud server, the dash cam and the IP camera, wherein, two-way information between the vehicle and the field installed with the IP camera can be received, shared and commonly managed, and the system App is cross-platform installed on the cloud server, the mobile terminal and the dash camera.

10 Claims, 6 Drawing Sheets

(56) References Cited

U.S. PATENT DOCUMENTS

| | | | |
|---|---|---|---|
| 2017/0228668 A1* | 8/2017 | Oreif | G06Q 10/1095 |
| 2018/0220189 A1* | 8/2018 | Hodge | G06Q 50/18 |
| 2018/0278896 A1* | 9/2018 | Schimelpfenig | H04N 5/76 |
| 2018/0357438 A1* | 12/2018 | Gayton | G06N 20/00 |
| 2018/0367731 A1* | 12/2018 | Gatti | H04N 21/4223 |
| 2019/0191126 A1* | 6/2019 | Gottlieb | H04N 21/4316 |
| 2020/0349666 A1* | 11/2020 | Hodge | G08G 1/017 |
| 2020/0396517 A1* | 12/2020 | Hodge | H04N 21/4223 |
| 2021/0097315 A1* | 4/2021 | Carruthers | G08B 13/19645 |
| 2021/0133847 A1* | 5/2021 | Mezaael | G06Q 10/0836 |

\* cited by examiner

INTELLIGENT AUTOMOBILE NETWORKING SYSTEM

CROSS-REFERENCE STATEMENT

The present application is based on, and claims priority from, Taiwan Application Serial Number 111114707, filed Apr. 18, 2022, the disclosure of which is hereby incorporated by reference herein in its entirety.

TECHNICAL FIELD

The present invention relates to technology field of internet of vehicles, and more particularly, an intelligent automobile networking system.

BACKGROUND

Internet of vehicles (IoV) refers to a network of vehicles through providing vehicle information from sensors, on-board terminals and electronic tags installed on vehicles, and using various communication technologies to realize the interconnection between vehicles and vehicles, vehicles and people, and vehicles and roads. On the network platform, the information among aforementioned entities is extracted and shared effectively, and the vehicles therefore can be effectively controlled and comprehensive services can be provided.

Existing dash camera usually includes a camera module, a microprocessor unit and a storage unit. When a user starts the vehicle, the vehicle's power supply is activated to power the dash camera, and the dash camera can be activated automatically or manually. While the vehicle is been driving, signal processing unit of the dash camera controls at least one of the camera modules arranged around the vehicle to take images around the vehicle, and then processes the captured image signals through the microprocessor unit, and transmits the processed image signals to the storage unit for storing images around the vehicle.

Currently, the existing dash camera can be used to take photos, videos, etc. The ways of sharing the photos and videos can be accomplished by (1) transferring the content of the built-in memory card in the dash camera to the computer and login to a social media platform to share the photos and videos; (2) connecting the dash camera to a mobile phone and downloading the photos and videos to the mobile phone, and then sharing them through the mobile terminal; (3) utilizing a control button to control App on the dash camera to accomplish the sharing of photos or videos.

People's life style has changed dramatically and benefited from the progress of science and technology, car has become an important living site to people's life. Nowadays, the dash camera installed on the car can provide functionalities beyond its original design, such as driving-related records checking, audio/video storage and downloading and some basic function settings, which can make it further intelligentized.

With the increasing development of on board equipment technology as well as the popularization and expansion of the internet of things (IoTs) concept, an intelligent networking that can integrate various living sites, through newly developed dash camera combined with cloud computing/networking technology, and makes it compatible with IoTs. A networking system is therefore desired to establish for connecting various living sites (such as home, car and office) via the newly developed dash camera combined with cloud computing technology.

SUMMARY

In view of the above problems, an intelligent automobile networking system is provided in the present invention, which includes a cloud server, a dash camera installed on a vehicle communicatively coupled to the cloud server to record videos and locations related to the vehicle while driving the vehicle, and an IP camera configured to be installed on living site excluding the cloud server and the vehicle, the IP camera communicatively coupled to the cloud server and the dash camera to record surveillance videos of the living site, and a mobile terminal communicatively coupled to the cloud server, the dash camera and the IP camera, and a system App integrating the intelligent automobile networking system used to establish a two-way reception and joint management between the vehicle and living site, wherein the system App is cross-platform installed on the cloud server, the mobile terminal and the dash camera.

In one preferred embodiment, the system App includes a Vehicle App, a Home App and a Travel App.

In one preferred embodiment, the Vehicle App includes application functions related to the dash camera and the vehicle.

In one preferred embodiment, the Home App includes application functions related to settings of the IP camera and alert of urgent situation of the living site.

In one preferred embodiment, the Travel App includes application functions related to travel planning and sharing of journey records.

In one preferred embodiment, the dash camera includes a camera module having a plurality of cameras used to capture road conditions and to surveil interior of the vehicle, an image processing module electrically coupled to the camera module and been used to process contents of the road conditions and contents of the interior of the vehicle, a communication module electrically coupled to the image processing module and a positioning device, when the contents, including the road conditions and the interior of the vehicle, have been processed in conjunction with the positioning device are transmitted to the cloud server in real time.

In one preferred embodiment, the IP camera is communicatively coupled to the cloud server via a cloud network.

In one preferred embodiment, the contents include still images, audios and videos.

In one preferred embodiment, the positioning device is a built-in global positioning system (GPS) module.

In one preferred embodiment, the intelligent automobile networking system provides a procedure to transmit information of the living site to the vehicle, the procedure includes steps of: communicatively connecting the dash camera installed on the vehicle to the IP camera of the living site; when security situation is happening at the living site, transmitting emergency contents of the living site to the cloud server and receiving an alert about the emergency contents by the dash camera through the system App; viewing the emergency contents of the living site in real time by a driver of the vehicle through the system App.

In one preferred embodiment, the intelligent automobile networking system provides a procedure to instantly transmit videos and locations of the vehicle to the living site, the procedure includes steps of: when a third party wants to know surrounding conditions of the driver, the third party sending a request to the driver through the system APP; after the request been received by the driver, the system triggering the mobile terminal to activate screen recording of the dash camera, uploading recorded videos of a period of time to the cloud server and sending the recorded videos back to the third party for viewing through the system App; locating real-time position of the driver by the third party through the positioning device to transmit real-time situation of the vehicle back to the third party.

In one preferred embodiment, the intelligent automobile networking system provides a procedure of how to share and edit traveling records, the procedure includes steps of: when an user travels with family members and friends, utilizing a shared calendar in the system APP to upload itinerary and traveling photos to a storage space of the cloud server; editing the itinerary, sharing the traveling photos and estimating expenditure of the itinerary in the shared calendar by the user, the family members and friends.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention proposed is related to technological field of the internet of vehicles, especially an intelligent automobile networking system, which can establish intelligent connections between different living sites through newly developed dash camera combined with cloud computing/networking technology. For example, the proposed intelligent automobile networking system can make connection between an IP cam at home and vehicle for realizing the possibility of connecting different living sites with a two-way information exchanging functionality.

Figure 1:
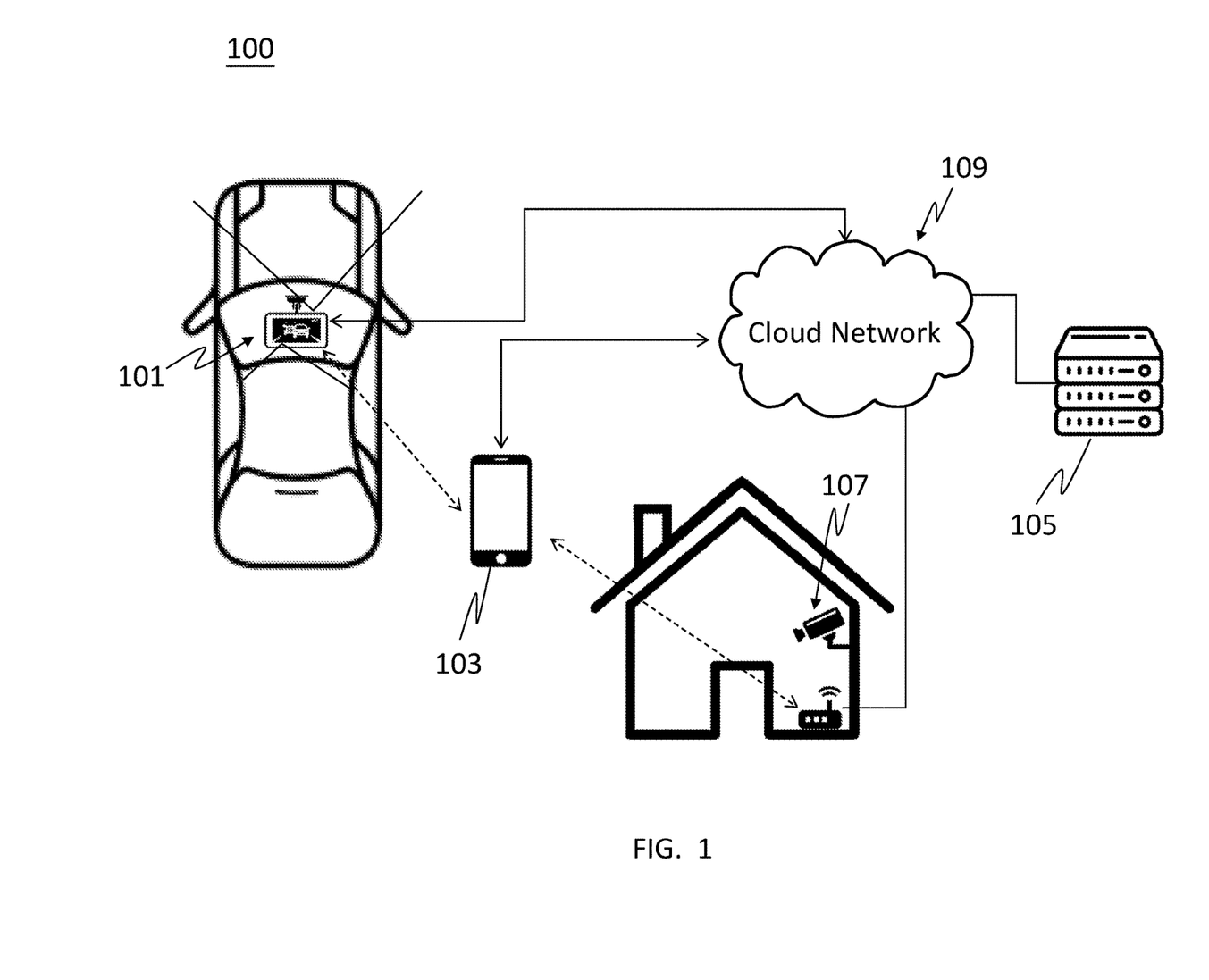
FIG. 1 illustrates the system architecture of the intelligent automobile networking system according to one embodiment of the present invention.

FIG. 1 illustrates the system architecture of the intelligent automobile networking system 100 according to one embodiment of the present invention, which includes a dash camera 101 installed inside a vehicle, a mobile terminal 103, a cloud server 105 and IP camera 107 installed at home. Where the dash camera 101 combines with cloud networking technology can provide connection with the IP camera 107 installed at home through the cloud network 109.

In one embodiment, the living site monitored by IP camera 107 is equivalent to the living site excluding vehicle and cloud server, that means, it can be a third party living site, such as home, office or the like.

The aforementioned dash camera 101, mobile terminal 103 cloud server 105 and IP camera 107 can interactively make data and information transmissions via communication networks, for example, network base stations (3G/4G/5G), data exchange equipment (such as WiFi, Bluetooth, etc.) and cloud networks.

The mobile terminal 103 may be a user's terminal device, such as a smart phone, a tablet computer, a smart wearable device, or the like. The dash camera 101 installed on the vehicle is able to record road conditions inside and outside the vehicle, and has a built-in positioning device, such as a global positioning system (GPS), which can report the position information obtained by the built-in positioning device to the cloud server 105.

The present invention proposes to intelligentize the dash camera 101 for its AI applications, which can integrate the networking between the dash camera 101 and the IP camera 107 with the assistance of cloud networking technology. In addition to its basic functions, such as checking captured driving-related audios/videos of the vehicle or its surroundings and setting default functions on the dash camera's App, both the recorded driving-related audios/videos of the vehicle or its surroundings and the surveillance videos recorded by home installed IP camera 107 can be uploaded to the cloud server 105 in real time through the cloud network. The App applied on the dash camera can instantly monitors home security through the real-time videos and acquires the emergency notification at car or vice versa to provide safety of living at home and vehicle.

In an embodiment of the present invention, the surrounding road conditions outside the vehicle recorded by the dash camera 101, which can comprise captured road condition information, such as road condition images and videos, and may also include environmental information of road, such as weather, road visibility, and the like. In one embodiment, the dash camera 101 can also record the shooting location and shooting time corresponding to the road condition as well as landscape information while shooting, and add these information to a travel sharing calendar for sharing recorded sceneries of the journey in the cloud server 105.

Figure 2:
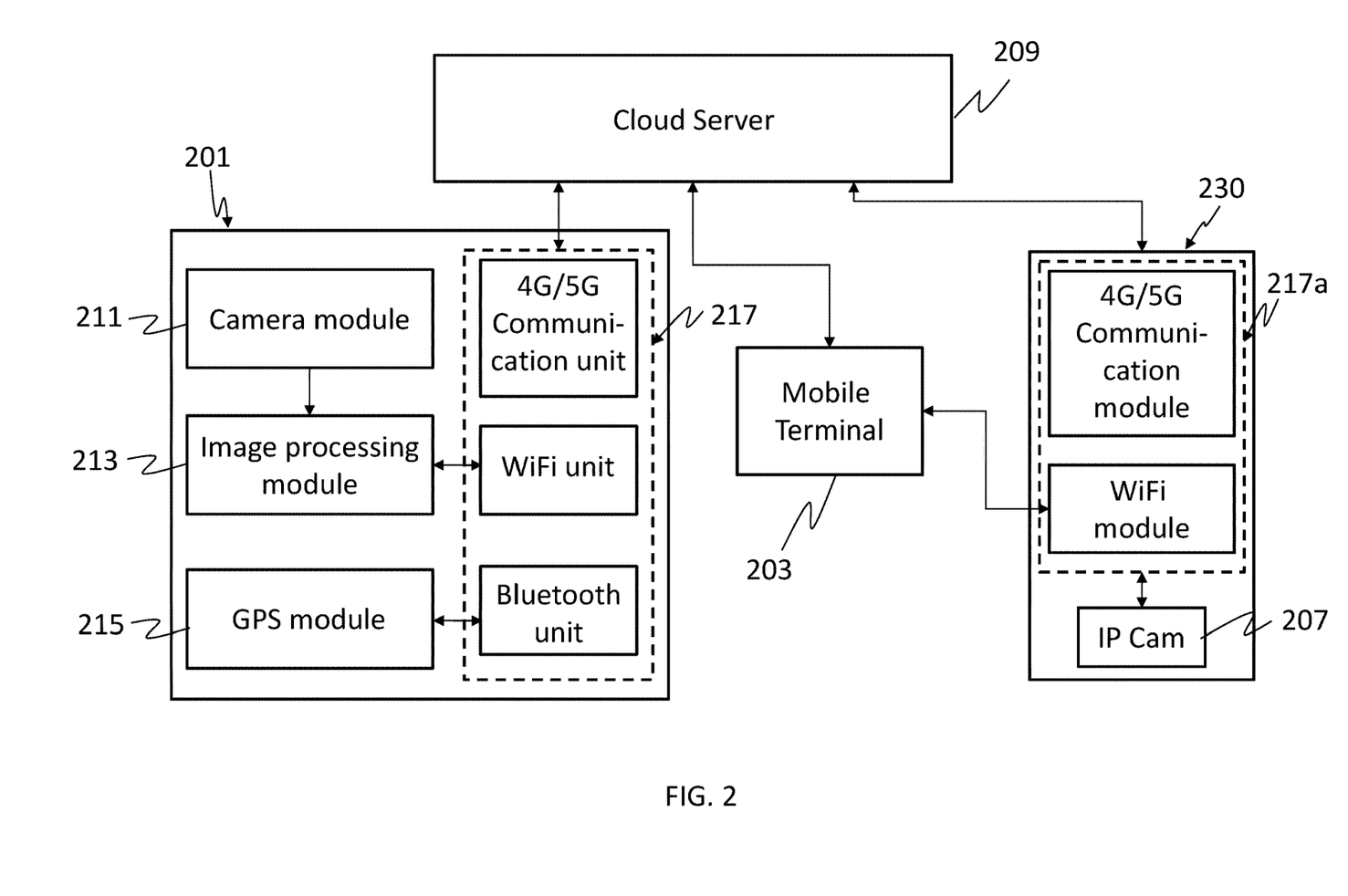
FIG. 2 illustrates a functional block diagram of the intelligent automobile networking system according to one embodiment of the present invention.

FIG. 2 shows a functional block diagram of the intelligent automobile networking system 100 according to one embodiment of the present invention. The dash camera 201 includes a camera module 211, an image processing module 213, a GPS module 215 and a communication unit 217. The camera module 211 includes a plurality of cameras, which are used to capture contents, such as road conditions and environmental information of road, and to monitor vehicle interior (including the surrounding conditions of the driver) while driving the vehicle. The aforementioned contents can be of various formats including still images, video and/or audio content. These contents, such as still images, audios and videos, are processed by an image processing module 213 in conjunction with a built-in positioning device, such as a global positioning system (GPS) module 215, the above-mentioned vehicle's driving-related video and location can be transmitted to the cloud server 209 in real time through the communication unit 217. The image processing module 213 is electrically coupled to the camera module 211.

In one embodiment, the communication unit 217 disposed in the dash camera 201 includes a 4G/5G communication unit, a WiFi unit, and a Bluetooth unit, wherein the WiFi unit and the Bluetooth unit are relatively short-range communication channels. The mobile terminal 203 is communicatively coupled to the cloud server 209 via a cloud network. The mobile terminal 203 is communicatively coupled to the dash camera 201 through a WiFi unit or a Bluetooth unit.

By intelligentizing the dash camera 201, it can be enabled to connected to the IP camera 207 installed at home 230 through the cloud network. The IP camera 207 is communicatively coupled to the cloud server 209 through the communication module 217a been set up at home 230.

In one embodiment, the communication module 217a installed at home 230 includes a 4G/5G communication module, a WiFi module, and a Bluetooth module (not shown), wherein the WiFi module and the Bluetooth module are relatively short-ranged communication channels. The mobile terminal 203 is communicatively coupled to the IP camera 207 through a WiFi module or a Bluetooth module while the mobile terminal 203 is nearby. In one embodiment, the IP camera 207 is communicatively coupled to the cloud server 209 through a WiFi module together with a long-range network installed at home 230, such as an optical fiber network.

Based on the system architecture shown in FIGS. 1-2, a two-way reception and joint management of information between car, home or other living sites can be achieved. Hereinafter, the present invention proposes a system App having three major intelligent functions integrated with the above-mentioned intelligent mobile networking system. Among them, the system App is cross-platform arranged on the cloud server, the mobile terminal and the dash camera.

The aforementioned system App is divided into three functional blocks, namely Vehicle App, Home App, and Travel App, which can access to the data stored in the cloud to offer more intelligent applications. Among them, Vehicle App contains the application functions regarding to the dash camera and the vehicle; Home App contains the application functions regarding to settings of the IP camera and alert of home urgent situations; Travel App includes travel planning and sharing of journey records.

Figure 3A:
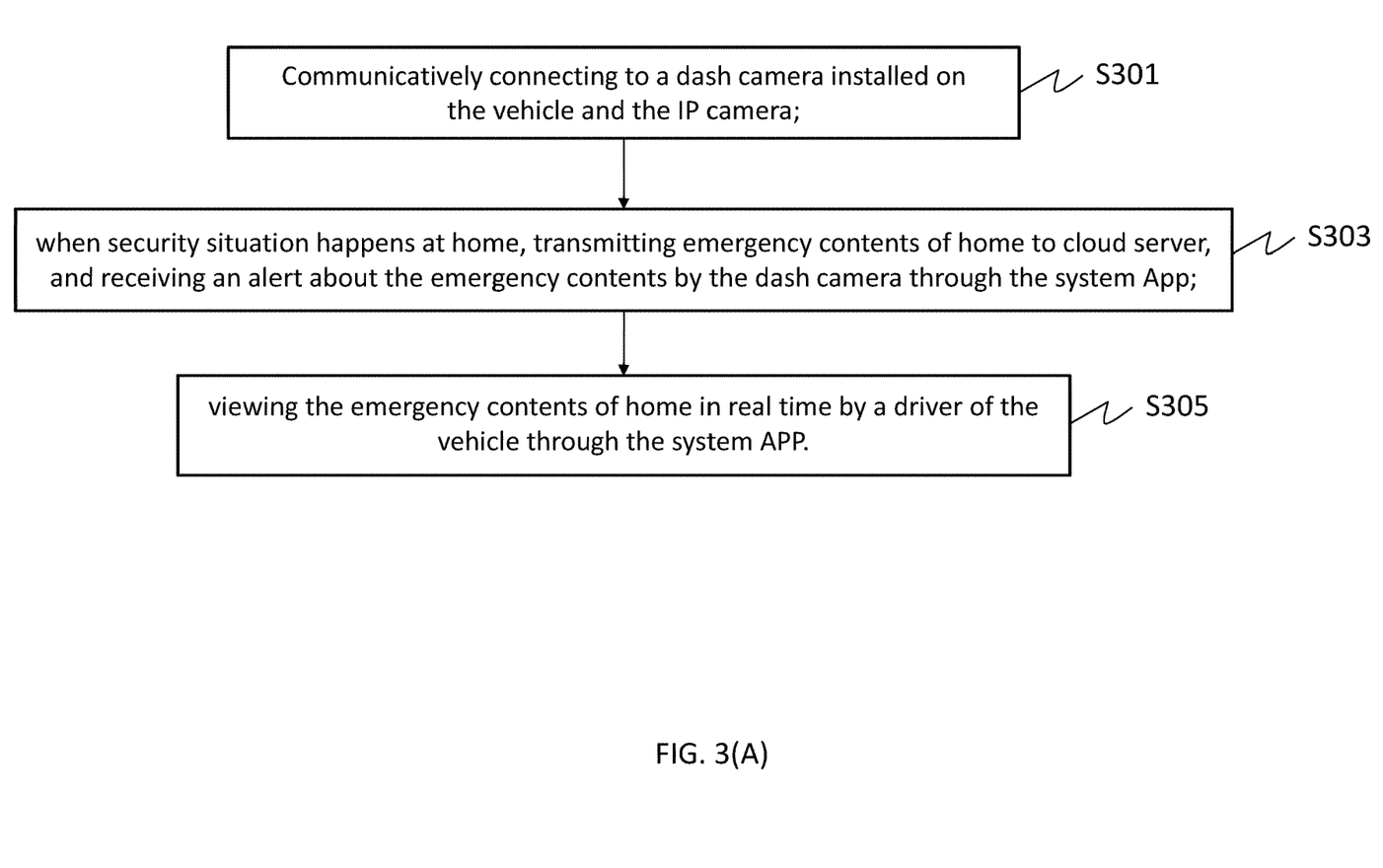
FIG. 3(A) shows how to transmit home information to the vehicle according to one embodiment of the present invention.

Utilizing the above-mentioned intelligent automobile networking system architecture (refer to FIGS. 1-2), the present invention can provide the following application scenarios. Please refer to FIG. 3(A), which shows how to transmit home information to the vehicle. First, user (driver) communicatively connects the vehicle (dash camera) with the IP camera at home through cloud network (step: S301); when there is a security issue happening at home, and the user is inconvenient to pick up the mobile phone (mobile terminal) to check what's happening at home while driving, in this situation, emergency contents at home (living site), such as still images and audios/videos, will be sent to the cloud server and an alert of this emergency situation will be received by the dash camera through the system App, and the complete contents of the emergency situation is read out by voice to notify the user (driver), so that the driver can receive the message at the first time without the need to turn on the mobile phone (step: S303); the driver can also view the real-time pictures or videos at home through the cloud application of the system App to understand the situation more clearly through the pictures or the videos, so that the emergency information from home can be shown/played to the driver (or passenger) in the vehicle (step: S305).

Figure 3B:
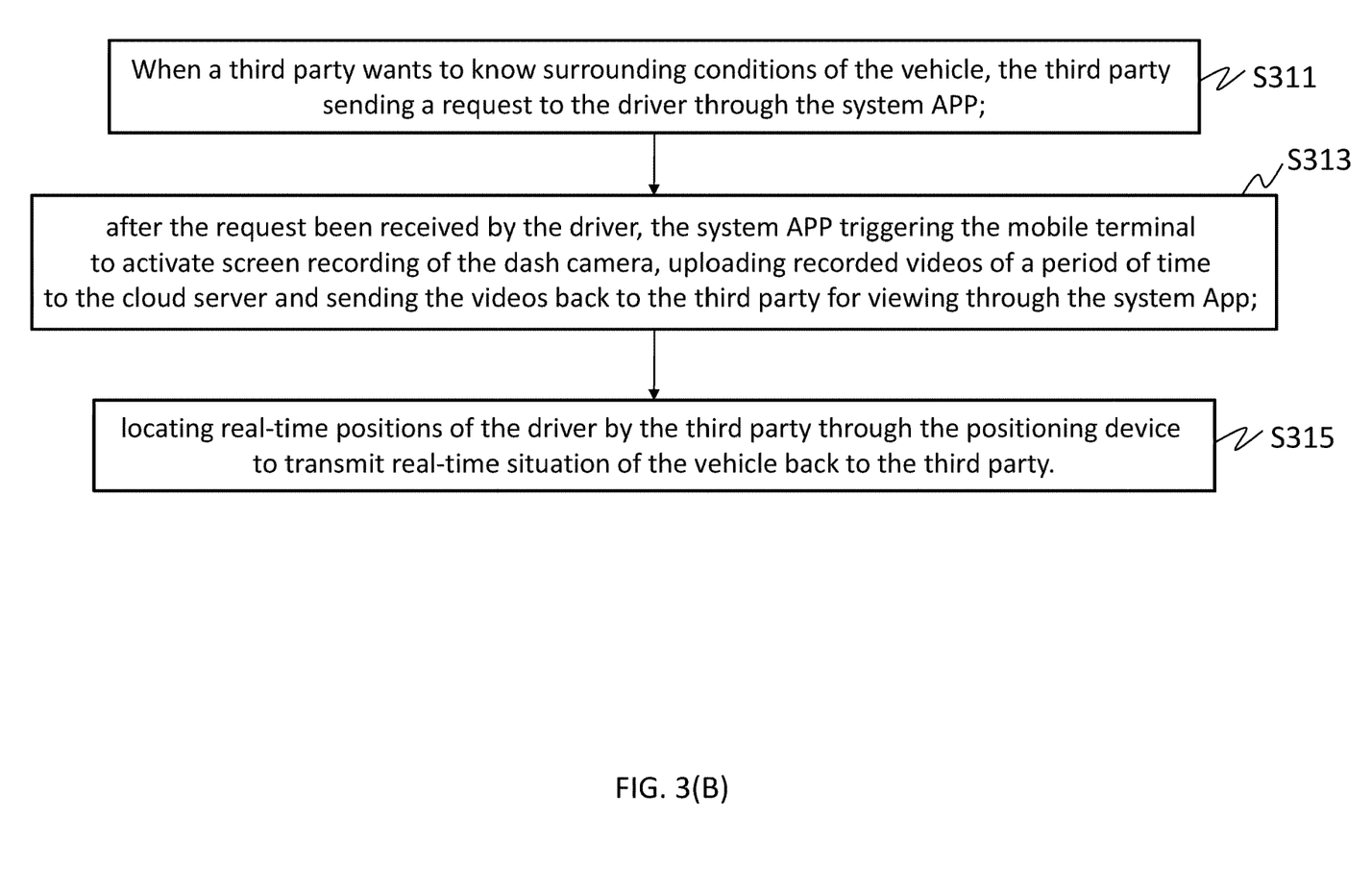
FIG. 3(B) shows how to transmit the video recording and location of the vehicle to a third party (e.g., home or office and the like) in real time according to one embodiment of the present invention.

Please refer to FIG. 3(B), which shows how to transmit the video recording and location of the vehicle to a third party (e.g., home or office and the like) in real time. When the third party wants to know the surrounding conditions of the driver, he/she can send a request to the driver through the system App (step: S311); after the request been received by the driver, the system App triggers the Bluetooth module of the mobile phone to activate the screen recording of the dash camera, uploads the video recorded while driving for 7 seconds (a period of time) to the cloud server, and sends it back to the third party for viewing through the system App (step: S313); the third party can also locate the driver's real-time position through the GPS module (positioning device) in the dash camera to obtain the real-time location of the driver, so that the driver can send live data back to the third party via the vehicle (step: S315).

Figure 3C:
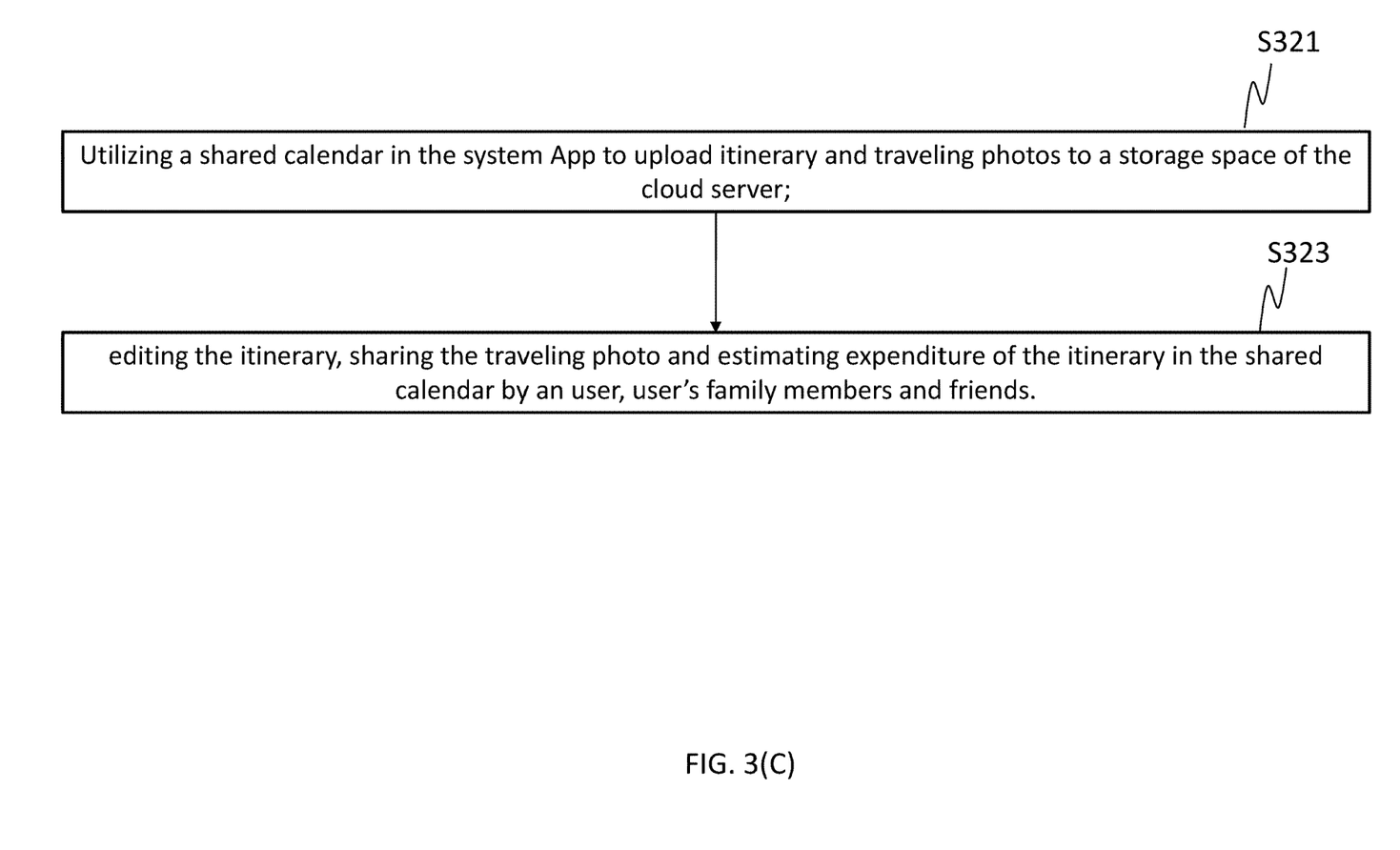
FIG. 3(C) shows how to share and edit traveling records according to a preferred embodiment of the present invention.

Please refer to FIG. 3(C), which shows how to share and edit traveling records. First, user utilizes the shared calendar in the system App, when traveling with family members and friends, uploads the itinerary and traveling photos to storage space of the cloud server (step: S321); then, the user can edit the travel plan together with family members and friends in the shared calendar, share the photos of the journey, estimate the total expenditure of the trip through the cloud application of the aforementioned system App (step: S323).

Figure 4:
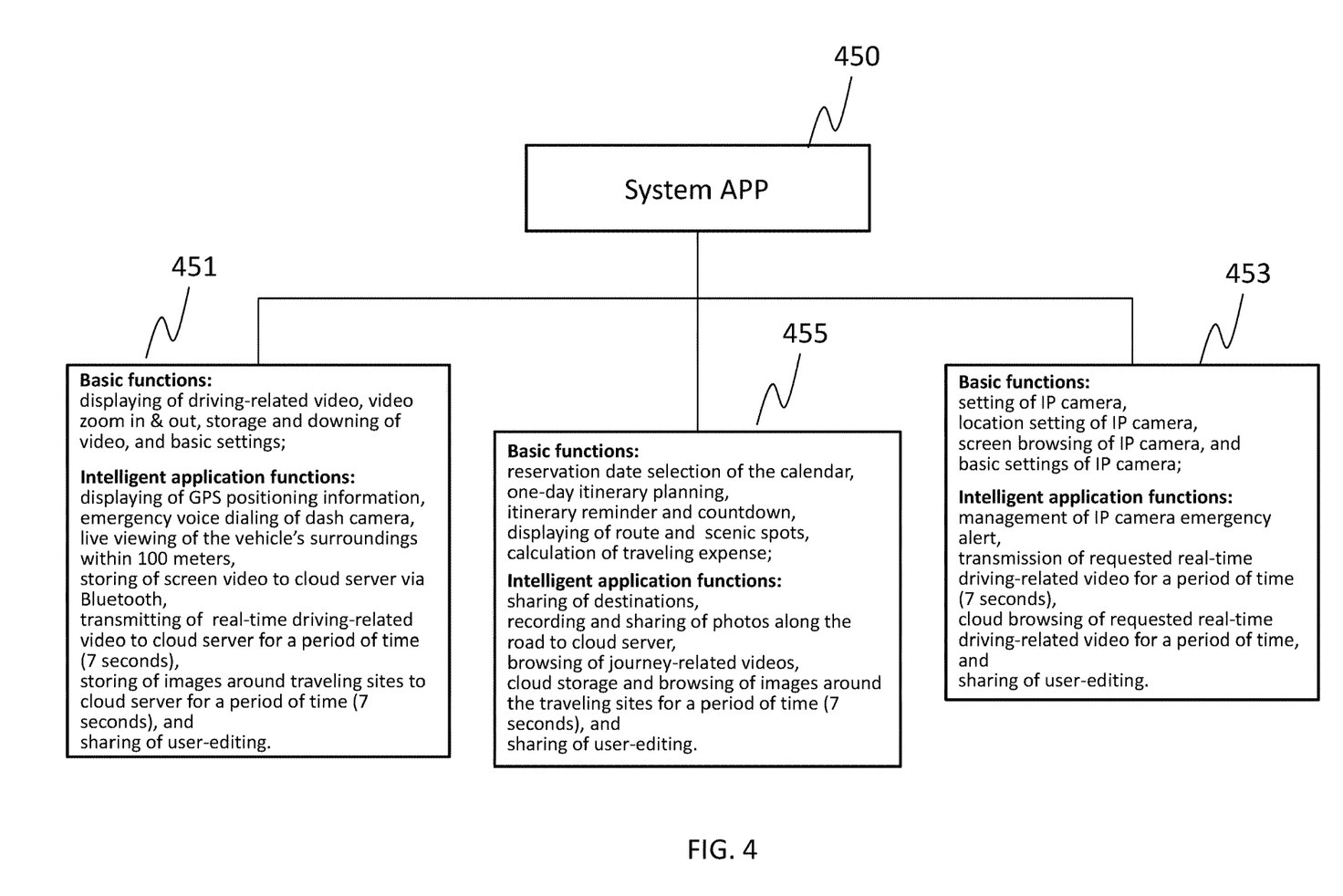
FIG. 4 illustrates the architecture of the system App according to a preferred embodiment of the present invention.

FIG. 4 shows the architecture of the system App 450, which is divided into three major functional blocks, namely Vehicle App 451, Home App 453 and Travel App 455, and the functions of the three major blocks are respectively detailed as follows.

The Vehicle App 451 covers the application functions of the dash camera and the vehicle, which includes (a) basic functions, such as displaying of driving-related video, video zoom in & out, storage and downloading of video, and basic settings; (b) intelligent application functions, such as displaying of GPS related positioning information, emergency voice dialing of dash camera, live viewing of the vehicle's surroundings within 100 meters, storing of screen video to cloud server via Bluetooth, transmitting of real-time driving-related video to cloud server for a period of time (7 seconds), storing of images around traveling sites to cloud server for a period of time (7 seconds), and sharing of user-editing.

The Home App 453 covers the application function settings of the IP camera at home and emergency alert of the home (living site) situation, which includes (a) basic functions, such as connection setting of IP camera, location setting of IP camera, screen browsing of IP camera, basic settings of IP camera; (b) intelligent application functions, such as management of IP camera emergency alert, transmission of requested real-time driving-related video for a period of time (7 seconds), cloud browsing of the requested real-time driving-related video for a period of time (7 seconds), and sharing of user-editing.

The Travel App 455 covers travel planning and sharing of journey records, which includes (a) basic functions, such as reservation date selection of the calendar, one-day itinerary planning, itinerary reminder and countdown, displaying of route and scenic spots, calculation of traveling expense; (b) intelligent application functions, such as sharing of destinations, recording and sharing of photos along the road to cloud server, browsing of journey-related videos, cloud storage and browsing of images around the traveling sites for a period of time (7 seconds), and sharing of user-editing.

Combining the above-mentioned intelligent automobile networking system, system App and cloud application, the present invention can provide an intelligent life style in which car and home are connected intelligently based on the applications and functions provided by the intelligent dash camera.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. An intelligent automobile networking system, said system comprising:
    a cloud server;
    a dash camera installed on a vehicle communicatively coupled to said cloud server to record videos and locations related to said vehicle while driving said vehicle; and
    an IP camera configured to be installed on living site excluding said cloud server and said vehicle, said IP camera communicatively coupled to said cloud server and said dash camera to record surveillance videos of said living site; and
    a mobile terminal communicatively coupled to said cloud server, said dash camera and said IP camera; and
    a system App integrating said intelligent automobile networking system used to establish a two-way reception and joint management between said vehicle and said living site;
    wherein said system App is cross-platform installed on said cloud server, said mobile terminal and said dash camera;
    wherein said dash camera includes:
    a camera module having a plurality of cameras used to capture road conditions and to surveil interior of said vehicle;
    an image processing module electrically coupled to said camera module and been used to process contents of said road conditions and contents of said interior of said vehicle;
    a communication module electrically coupled to said image processing module and a positioning device;
    when said contents, including said road conditions and said interior of said vehicle, have been processed in conjunction with said positioning device are transmitted to said cloud server in real time;
    wherein said intelligent automobile networking system provides a procedure of how to share and edit traveling records, said procedure includes steps of: when a user travels with family members or friends, utilizing a shared calendar in said system App to upload itinerary and traveling photos to a storage space of said cloud server; editing said itinerary, sharing said traveling photos and estimating expenditure of said itinerary in said shared calendar by said user, said family members or friends.

2. The intelligent automobile networking system of claim 1, wherein said system App includes a Vehicle App, a Home App and a Travel App.

3. The intelligent automobile networking system of claim 2, wherein said Vehicle App includes application functions related to said dash camera and said vehicle.

4. The intelligent automobile networking system of claim 2, wherein said Home App includes application functions related to settings of said IP camera and alert of urgent situation of said living site.

5. The intelligent automobile networking system of claim 2, wherein said Travel App includes application functions related to travel planning and sharing of journey records.

6. The intelligent automobile networking system of claim 1, wherein said IP camera is communicatively coupled to said cloud server via a cloud network.

7. The intelligent automobile networking system of claim 1, wherein said contents include still images, audios and videos.

8. The intelligent automobile networking system of claim 1, wherein said positioning device is a built-in global positioning system (GPS) module.

9. The intelligent automobile networking system of claim 1, wherein said intelligent automobile networking system provides a procedure to transmit information of said living site to said vehicle, said procedure includes steps of:
    communicatively connecting said dash camera installed on said vehicle to said IP camera of said living site;
    when security situation happens at said living site, transmitting emergency contents of said living site to said cloud server and receiving an alert about said emergency contents by said dash camera through said system App;
    viewing said emergency contents of said living site in real time by a driver of said vehicle through said system App.

10. The intelligent automobile networking system of claim 1, wherein said intelligent automobile networking system provides a procedure to instantly transmit videos and locations of said vehicle to said living site, said procedure includes steps of:
    when a third party wants to know surrounding conditions of said driver, said third party sending a request to said driver through said system App;
    after said request been received by said driver, said system App triggering said mobile terminal to activate screen recording of said dash camera, uploading recorded videos of a period of time to said cloud server and sending said recorded videos back to said third party for viewing through said system App;
    locating real-time position of said driver by said third party through said positioning device to transmit real-time situation of said vehicle back to said third party.

* * * * *